(12) United States Patent
Chen et al.

(10) Patent No.: US 10,459,900 B2
(45) Date of Patent: Oct. 29, 2019

(54) HOLISTIC DOCUMENT SEARCH

(71) Applicant: International Business Machines Corporation, Armonk, NY (US)

(72) Inventors: Ying Chen, San Jose, CA (US); Ioana Roxana Stanoi, Bronx, NY (US); Su Yan, San Jose, CA (US); Mo Yu, State College, PA (US)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 15/183,742

(22) Filed: Jun. 15, 2016

(65) Prior Publication Data

US 2017/0364594 A1    Dec. 21, 2017

(51) Int. Cl.
*G06F 16/22* (2019.01)
*G06F 16/93* (2019.01)

(52) U.S. Cl.
CPC .......... *G06F 16/2228* (2019.01); *G06F 16/93* (2019.01); *G06F 16/2282* (2019.01)

(58) Field of Classification Search
None
See application file for complete search history.

(56) References Cited

U.S. PATENT DOCUMENTS

| | | | |
|---|---|---|---|
| 6,084,595 A | 3/2000 | Bach et al. | |
| 8,126,897 B2 | 2/2012 | Sznajder et al. | |
| 8,412,703 B2 | 4/2013 | Yu | |
| 8,756,497 B2 | 7/2014 | Le Chevalier et al. | |
| 9,922,090 B1 * | 3/2018 | Zukowski | G06F 17/30501 |
| 9,959,305 B2 * | 5/2018 | Zoryn | G06F 17/30339 |
| 2010/0299332 A1 * | 11/2010 | Dassas | G06F 17/245 |
| | | | 707/741 |
| 2011/0082868 A1 * | 4/2011 | Musuluri | G06F 17/30864 |
| | | | 707/749 |
| 2012/0084282 A1 * | 4/2012 | Chiang | G06F 17/30864 |
| | | | 707/725 |

OTHER PUBLICATIONS

Faure et al., "Detection of Figure and Caption Pairs based on Disorder Measurements", Proc. SPIE7534, Document Recognition and Retrieval XVII, 75340S (Jan. 18, 2010).

(Continued)

*Primary Examiner* — Christopher J Raab
(74) *Attorney, Agent, or Firm* — Jeffrey S LaBaw; William Stock

(57) ABSTRACT

A set of documents is parsed. Members of the set of documents include a set of text elements and a set of visual elements. A text content stream based on the set of text elements and a visual content stream based on the set of visual elements are produced. For respective documents, a set of respective visual element summarizations is built from the visual content stream. Each visual summarization includes a text description of a respective visual element in the respective document. A holistic index is created by indexing the text content from the text content stream and the text descriptions of the visual elements in a single search index. The indexing uses a set of semantic relationships between the text content from the text content stream and the textual descriptions of the visual elements. A user interface allows a user to selectively search text content and visual content.

18 Claims, 10 Drawing Sheets

| LITERAL TYPE | EXAMPLE |
|---|---|
| ABSENCE OF THE INITIAL | HEORETICAL, BJECT-ORIENTED, OMMUNICATION |
| SPLIT OF ONE WORD | SPRINGER- VERLAG, L ATEX, MEM- OIRS |
| CORRUPTED STRING | INT\\\\L CONF., O\\\REILLY |

601

603 — LITERAL TYPE – TABLE CONTENT, TABLE HEADING, CELL POSITION T11
EXAMPLE – TABLE CONTENT, TABLE HEADING, CELL POSITION T12
ABSENCE OF THE INITIAL – TABLE CONTENT, CELL POSITION T21
⋮

605 — TABLE 3: COMMON LITERAL DUE TO PDF EXTRACTION

607 — SENTENCE A
SENTENCE B
SENTENCE C
SENTENCE D
SENTENCE E

609 — PAGE 5

(56) References Cited

OTHER PUBLICATIONS

Frankel et al. "Webseer: An image search engine for the world wide web", Technical Report TR-96-14, CS Department, Univ. of Chicago, 1996.
Liu et al. Automatic Searching of Tables in Digital Libraries , WWW 2007: 1135-1136.
Liu et al., TableSeer: automatic table metadata extraction and searching in digital libraries , JCDL 2007: 91-100.
Pinto et al., Table Extraction Using Conditional Random Fields, ACM SIGIR, 2003.

* cited by examiner

238     I.A. ZADEH

401

$$U = W_1 U_1 + \ldots + W_N U_N \quad (3.88)$$

403

WHERE THE $W_i$ ARE CONSTANT COEFFICIENTS, IS GIVEN BY $$L(U) = L(W_1 U_1 + \ldots + W_N U_N) = W_1 L(U_1) + \ldots + W_N L(U_N). \quad (3.89)$$

405

THE IMPORTANT POINT OF DIFFERENCE BETWEEN (3.89) AND (3.88) IS THAT ......

407

| X | 1 | 2 | 3 | 4 | 1∨2 |
|---|---|---|---|---|-----|
| 1 | 1 | 2 | 3 | 4 | 1∨2 |
| 2 | 2 | 4 | 6 | 8 | 1∨4 |
| 3 | 3 | 6 | 9 | 12 | 3∨6 |
| 4 | 4 | 8 | 12 | 16 | 4∨8 |

409

TABLE 1. EXTENSION OF THE MULTIPLICATION TABLE TO SUBSETS OF INTEGERS, 1∨2 MEANS 1 OR 2......

411

IN MANY APPLICATIONS OF THE EXTENSION PRINCIPLE, SHOWN IN TABLE 1 ......

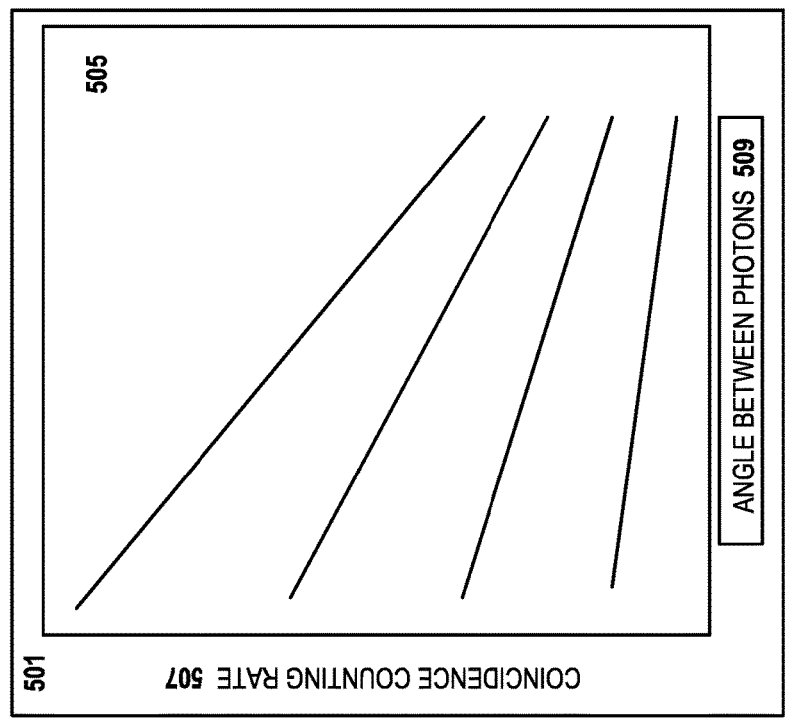

FIG. 3. DISTRIBUTION OF THE COINCIDENCE COUNTING RATE VERSUS ANGLE BETWEEN PHOTONS FROM POSITRONS ANNIHILATING IN RUBIDIUM AND KRYPTON COMPARED......

TABLE I. RUBIDIUM. K DENOTES THE PERCENTAGE NARROW COMPONENT USING A KRYPTON CORE AND G DENOTES THE PERCENTAGE NARROW COMPONENT AS DETERMINED..........

| TEMP (oC) | PHASE | % NARROW COMPONENT K | % NARROW COMPONENT G |
|---|---|---|---|
| -168 | SOLID | 67 | 64 |
| -54 | SOLID | 63 | 56 |
| 34 | SOLID | 55 | 55 |
| 43 | LIQUID | 57 | 56 |

| LITERAL TYPE | EXAMPLE |
|---|---|
| ABSENCE OF THE INITIAL | HEORETICAL, BJECT-ORIENTED, OMMUNICATION |
| SPLIT OF ONE WORD | SPRINGER- VERLAG, L ATEX, MEM- OIRS |
| CORRUPTED STRING | INT\\\\L CONF., O\\\\REILLY |

603

LITERAL TYPE – TABLE CONTENT, TABLE HEADING, CELL POSITION T11

EXAMPLE – TABLE CONTENT, TABLE HEADING, CELL POSITION T12

ABSENCE OF THE INITIAL – TABLE CONTENT, CELL POSITION T21

...

605 — TABLE 3: COMMON LITERAL DUE TO PDF EXTRACTION

607
SENTENCE A
SENTENCE B
SENTENCE C
SENTENCE D
SENTENCE E

609 — PAGE 5

*FIG. 6*

QUERY: CURRY BASKETBALL    IMAGE:    TABLE:    TEXT:
1001

RETURNED IMAGES:
1003

1005    1007

RETURNED TABLES:
1009

| SEASON  | AGE | TM  | LG  |
|---------|-----|-----|-----|
| 2009-10 | 21  | GSW | NBA |
| 2010-11 | 22  | GSW | NBA |
| 2011-12 | 23  | GSW | NBA |

1011

| GS | MP   | FG  | FGA  |
|----|------|-----|------|
| 77 | 2896 | 528 | 1143 |
| 74 | 2489 | 505 | 1053 |
| 23 | 732  | 145 | 296  |

1013

RETURNED DOCUMENTS:
1015

Born in Ohio in 1988 to former NBA
nered national attention for his impre
1017

For an encore, Curry helped the
starting gate in 2015-16, a torrid
1019

HOLISTIC DOCUMENT SEARCH

BACKGROUND OF THE INVENTION

This disclosure relates generally to machine searches of a set of documents. More particularly, it relates to an improved search system and method for holistically indexing text and visual information in a set of documents.

There is a plethora of information available on the Internet, and in private data networks, covering every subject imaginable. It is a challenge to find the desired information within the bounty of available information. To that end, there are many search engines which provide search results to the user on a requested topic. Most of the search engines are text and key word based, and retrieve the search results based on previously indexed information. Text based search engines only index and search the textual content of a document, ignoring the visual elements such as images. Image based search engines can search images based on the metadata associated with the image or on visual patterns of the images, but typically ignore the surrounding page in which the images are found during the indexing and searching processes.

There remains a need for improved search and indexing mechanisms to locate information on the Internet, and other document based databases.

BRIEF SUMMARY

According to this disclosure, a method, apparatus and computer program product for searching a set of documents is described. A set of documents is parsed. Members of the set of documents include a set of text elements and a set of visual elements. A text content stream based on the set of text elements and a visual content stream based on the set of visual elements are produced. For respective documents in the set of documents, a set of respective visual element summarizations is built from the visual content stream. Each visual summarization includes a text description of a respective visual element in the respective document. A holistic index is created by indexing the text content from the text content stream and the textual descriptions of the visual elements in a single search index. The indexing uses a set of semantic relationships between the text content from the text content stream and the textual descriptions of the visual elements. A user interface allows a user to selectively search text content and visual content.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 4 illustrates a scanned document including text and table information according to an embodiment of the invention;

FIG. 5 illustrates a scanned document including figure and table information according to an embodiment of the invention;

FIG. 6 illustrates a table summarization constructed according to an embodiment of the invention;

DETAILED DESCRIPTION OF THE DRAWINGS

At a high level, in preferred embodiments of the invention, the present invention provides a holistic document search (HDS) system. HDS indexes both textual content and visual content from a document. Unlike the prior art search engines that only index a single element type, HDS extracts a plurality of element types from a document and correlates the respective element types so that multiple types of ranked document elements can be retrieved from a single search. This is significantly different from traditional search engines where a table search engine only returns tables, an image search engine only returns images and a text search engine only returns text.

Figure 1:
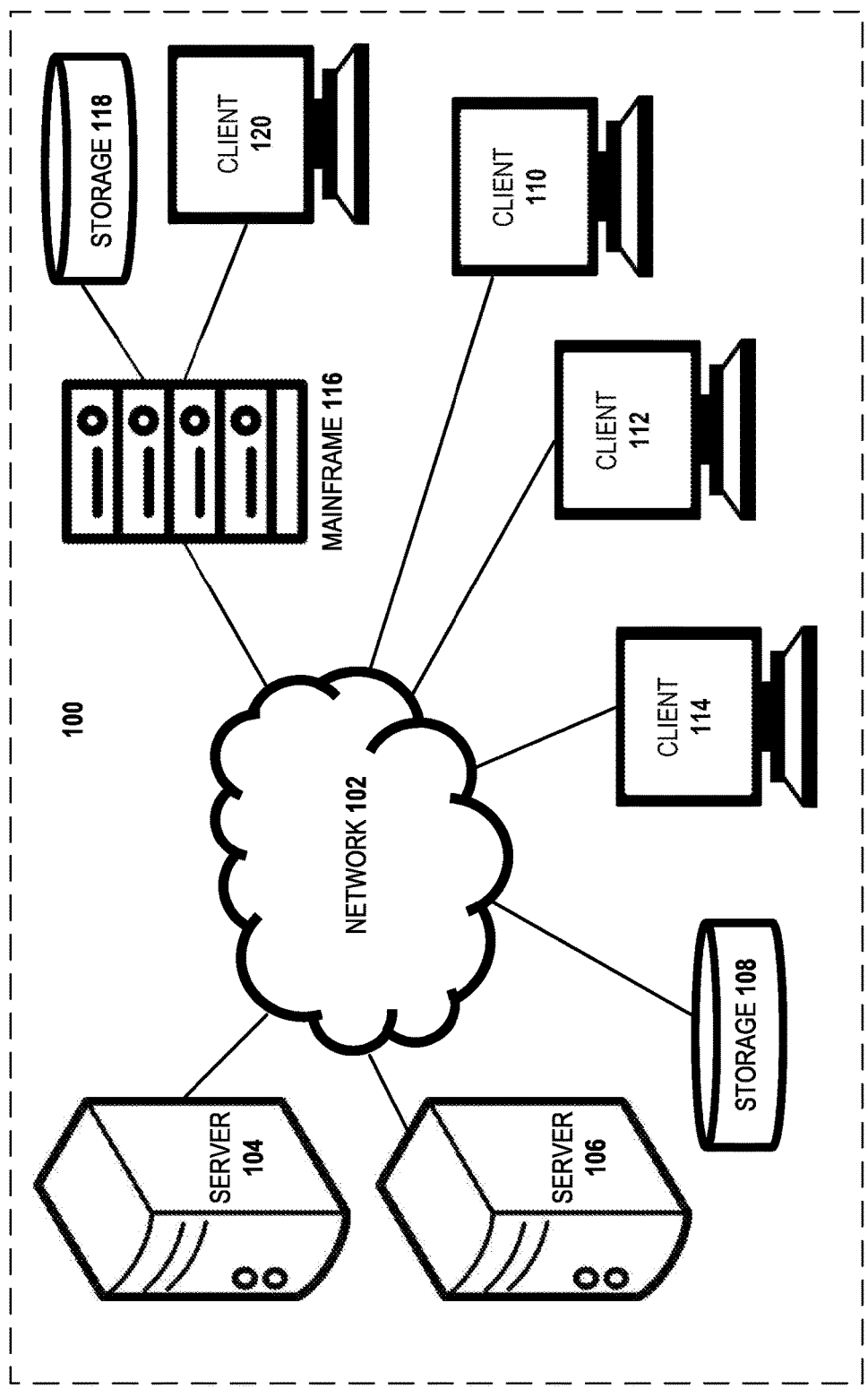
FIG. 1 depicts an exemplary block diagram of a distributed data processing environment in which exemplary aspects of the illustrative embodiments may be implemented.
Figure 2:
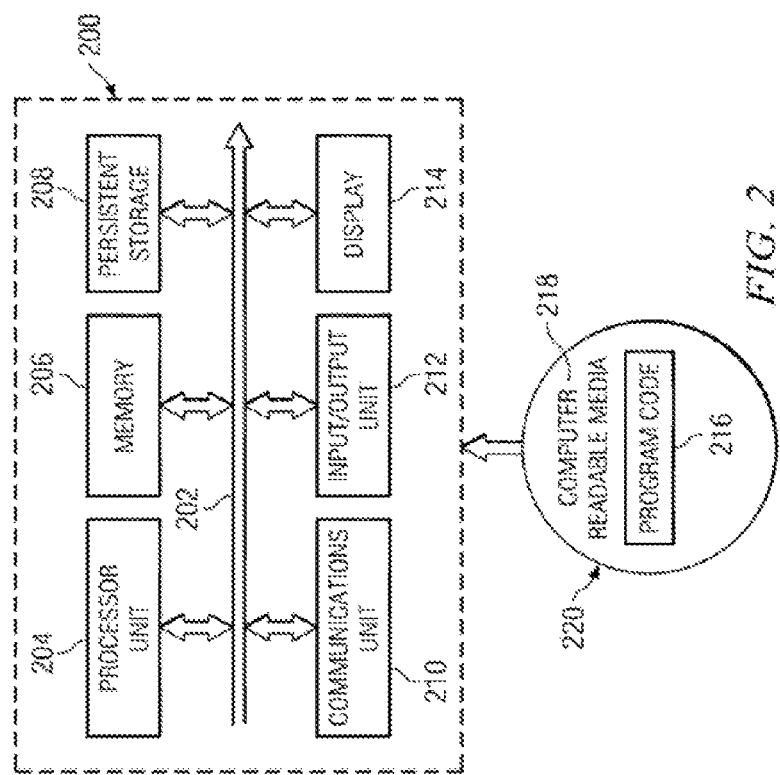
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the drawing, mainframe computer 116 is shown connected to network 102. Mainframe computer 116 can be, for example, an IBM System z mainframe running the IBM z/OS operating system. Connected to the mainframe 116 are mainframe storage unit 118 and client 120. Client 120 is either a PC connected directly to the mainframe communicating over a bus, or a console terminal connected directly to the mainframe via a display port.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities.

Documents often contain visual elements such as images, tables, figures and graphs. These visual elements help authors present detailed results and complex relationships, patterns, and trends clearly in a simple and organized manner. For example, in scientific papers using visual elements in addition to pure textual content reduces the length of the manuscript and enhances readers' understanding of the study results.

Images, tables, figures and graphs are integral elements of documents that convey important information. In many domains, such as finance, science and technology, key study results are typically reported in the form of tables or graphs. Ideally, when searching a document corpus, one would like to locate information from different perspectives and different information element types, and would be able to query the corpus accordingly. For instance, using embodiments of the present invention, a natural language search query can be input to the search engine to "find all the tables, graphs and text that describe the synthesis of compound X".

Current document search engines only index and search the textual content of documents and ignore the important visual elements. There are specialized search engines that are focused on individual types of visual elements. Table search engines enable users to search tables by table metadata. Image search engines provide the functionality of searching images by image metadata or by visual patterns. However, such specialized search engines only focus on isolated individual visual elements rather than taking into account the visual elements context in the document. As a result, the rich relationships between the textual content of a document and the visual elements, as well as the associations between different types of visual elements are lost in specialized search engines as well as in traditional text content search engines.

To overcome the drawbacks and limitations of current document search techniques, the inventors have developed a new document search system and solution called "holistic document search" (HDS). HDS is implemented on the recognition that a document contains both textual content and visual content, and that the textual and visual content are related symantically. For example, a given document may be comprised of text and visual content and the visual content is made up of tables and figures. A figure can be a line drawing, a flowchart or a graph, such as an x-y plot. Unlike the prior art that only focuses on one individual element type of a document, HDS considers a plurality of element types and correlates the respective elements appropriately to present a more comprehensive searchable view of the document to end users. As discussed below, HDS enables users to search documents from different perspectives from a single search engine.

According to a given search query, HDS can return relevant text, tables and/or images as specified by the query. This is significantly different from traditional search engines where a table search engine only returns tables, an image search engine only returns images and a text search engine only returns text.

HDS is different from a simple wrapper of multiple types of search engines, i.e. if one were to wrap a preexisting text search engine, a table search engine and an image search engine under a unified interface. Since the different types of search engines are built independently, the relationships between text, tables, and images are not captured under such an arrangement. HDS captures the semantics and relationships between textual content and visual content. The relationships between elements are incorporated while building the underlying index of HDS.

In the description below, the visual content is often discussed in terms of the type of visual element, that is, a table element, a figure element or an image element, or simply a table, figure or image. Each visual element may have subelements, e.g., a table element is comprised of table cell elements. Further, each visual element may have features which can be rendered into a textual form. For example, a table cell element may be a table heading and has a cell position within the table. An image element may have a shape feature, color feature, position feature and object feature (a recognizable named object).

Figure 3:
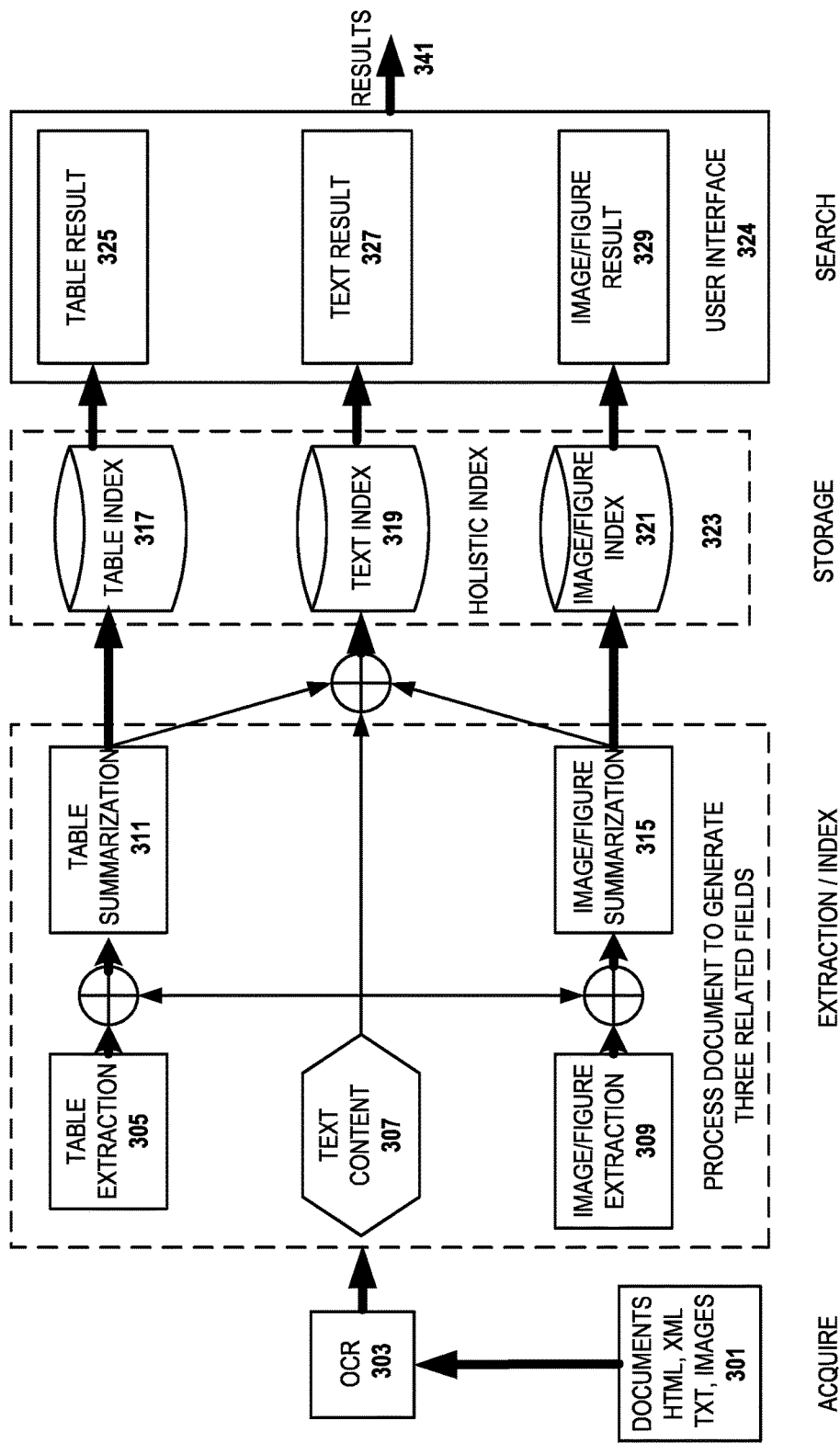
FIG. 3 illustrates a more detailed exemplary computer environment in which the disclosed subject matter may be implemented.

As shown in FIG. 3, a schematic diagram illustrates the holistic document search (HDS) system, in accordance with an embodiment of the present invention. The system begins in an acquisition phase by acquiring a set of documents in step 301. In a preferred embodiment, HDS handles documents in different formats, including pure text files, HTML files, XML files, PDF files and scanned documents. For example, an input document can be in the scanned document format, which is an image. The input document is passed to an Optical Character Recognition (OCR) engine to convert portions of the scanned file into a text file, step 303. In alternative embodiments of the invention, the set of documents are acquired in an already scanned, recognized and ready format.

In the extraction phase, tables, text and image/figures are then respectively extracted from the document file by the table extraction module 305, the text extraction module 307 and image/figure extraction module 309. The extraction techniques are selected from suitable prior art table, text and image/figure extraction techniques in embodiments of the invention. The process of feature extraction is also called feature identification. In preferred embodiments, the extraction techniques are based on techniques discussed in the following sections. In alternative embodiments, there are a plurality of extraction modules for each type of visual content, e.g., a plurality of image extraction modules each for handling a particular type of image, or a plurality of image feature extraction modules each for extracting a particular type of image feature. In yet other embodiments of the invention, all visual content: images, tables, figures, graphs can be handled in one stream, while the text content is handled in its own stream. In the illustrated embodiment, the original input document has been divided into three streams, the text content, the table content, and the image/figure content. The location of each table and image is obtained from the OCR result, for example, in the form of a bounding box, e.g., defined by the x-y axis of the upper left and lower right corners. Other embodiments of the invention have more content streams, e.g., one content stream for each visual content type, for example, each image type and each figure type.

In the illustrated embodiment, tables and image/figures are then summarized respectively by the table summarization module 311 and the image/figure summarization module 315. These modules render the features of the table or image/figures into text so that they can be correlated and indexed with the extracted text content from the document. For example, the table summarization module 311 can summarize a table by using the table features identified by the table extraction module 305, e.g., the captions, column and row headings, the content of different cells within the table as well as the positions of the cells, and content within the table so that the table features can be correlated with other document features in the indexing process. The image/figure summarization module 309 uses the image/figure features identified by the image/figure extraction module 309 such as legends on axes, a characterization of shapes of the features in the figure, an estimate of the values of parameters at different points on a line and other features. Image summarization can include identifying objects within the image, e.g., a person, a house, a bird. For example, embodiments of the invention use IBM Multimedia Analysis and Retrieval System (IMARS), Visual Insights and AlchemyAPI for detecting objects in images. As part of the summarization, the original visual elements, i.e. image, table or figure, can be included in the information to be indexed so that they can be returned in a subsequent search. No text summarization module is shown in the drawing as the text is presumed to already be in a suitable format. In an alternative embodiment of the invention, text translation modules are used in the text stream to render a foreign language document into a searchable format for a target language.

Next the table index 317, text index 319 and image/figure index 321 are created and stored in the storage phase. One or more of the three indexes are constructed to produce the holistic index 323. As shown in the drawing, the text index 319 is the holistic index as it includes both table and image/figure information in the text index. In the illustrative embodiment, the table index 317 contains only the table index information, and the image/figure index 321 contains only the image/figure index information. However, in alternative embodiments of the invention, all three indexes are holistic indexes, holding information from all three information element types. Yet other embodiments of the invention split the image/figure index into two or more image/figure indexes based on the information element type.

According to a preferred embodiment of the invention, the indexing of information is performed semantically. That is, the text information from the table summarization or the image/figure summarization describing the features of the tables and images/figures is correlated semantically with the text content to determine which table and image/figure elements should be correlated in the index with respective text elements. In a preferred embodiment of the invention a proximity correlation is added to the indexing process. The inventors recognize that text which describes the table or image/figure is most likely to be proximate to the respective table or image/figure in the document and the further the text is from the table or image/figure the less likely it is that the text refers to the particular table or image/figure. Thus, proximity is an important factor in weighting the possible correlation between text, image/figure elements and text elements. Proximity as a single factor, i.e. alone without semantic meaning, can also be useful in some embodiments of the invention. However, proximity alone is not always accurate. For example, due to formatting, some figures and tables, e.g., large figures or tables, will be placed pages away from where the figure/table being referenced, or placed at the end of the document, or in a separate document. In such cases, proximity alone does not work well. It is preferred to use both semantic meaning and proximity as factors in the holistic indexing process.

In the search phase, the user enters a search into the user interface 324 according to the desired criteria. If the user only wants to search only table results or image/figure results, the search can be directed to the table index 317 to obtain a table result 325 or to the image/figure index 321 to obtain an image/figure result 329. A single purpose index will likely produce slightly quicker results. Even if only the table index 317 is searched, the results will be different from a pure table search engine of the prior art. In the present invention, the content of the table index is different as it includes the semantic relationships to other document elements which are absent from the prior art indices. So the table results returned will be according to the knowledge gained about the tables from semantically related text and images. If the user wants results which combine text, table and image/figure results, in the illustrated embodiment, the search will be directed to the text index 315 which contains semantically, and optionally proximately related, table, text and image/figure elements from the documents. Thus, the "text" results 327 from the text index 315 can include table and image/figure elements if specified by the user search terms. A search requesting solely text results would be directed to the text index 315. In embodiments of the invention where the table index 317 and image/figure index 321 contain different elements, e.g., text and image/figure elements in the table index, the search can be directed to any of the indexes. A front-end user interface 324 can understand and parse the user search query according to the system design. For example, in some embodiments, the holistic search engine, a user can use an image as a search query, but specify that the search engine is to return all the related tables to the image. Similarly, a table can be used as a search query and the user can specify to return text and tables. Other combinations of search terms and search results are possible. The user interface component 324 understands and parses user search queries whether the search queries are text based, either using specialized search terms or a natural language query, or graphically based user interface embodiments where query elements are manipulated in a drag and drop interface.

FIG. 4 shows the OCR result of a scanned document page containing text and table elements. A set of bounding boxes are shown, each bounding box surrounding a respective text or table element. The OCR engine converts a scanned document into several elements 401-413, each of which are designated as a text or table element and depicted with a surrounding bounding box. For example, text element 401 includes a page number (238) and an author name (I. A. Zadeh). This information can be used to make semantic inferences from text elements elsewhere in the document that refer to information which occurs on page 238. The text elements 403, 405 and 407 are shown to be semantically related by the text in element 407.

FIG. 4 also shows semantic relationships between the table shown in element 409 and the text caption in text element 411 and a paragraph which discusses the table in text element 413. The text caption 411 labels the table as "Table 1", indicates the meaning of the table as well as certain elements, e.g., 1V2. The text caption 411 helps identify the table discussed in the paragraph element. All of the semantic relationships between the text elements and table elements can be indexed and searched according to the invention. The reader will note that the text in various text elements of the drawing is truncated for ease in illustration.

Computer vision techniques can be used to extract tables and figures from the background text. There are many existing works that solve this problem. For example, table extraction techniques include the TableSeer or Tabula table extraction methods which detect the boundaries of the table and respective table elements such as row and column boundaries.

As the feature extraction technique recognizes that bounding box 409 contains an extracted table, the feature extraction technique gathers all the text generated by the OCR engine inside the table bounding box. In particular, the feature extraction method searches for the keyword "Table" and retrieves the text element that contains the keyword as the table caption. However, if the "Table" keyword is not found within the bounding box, the feature extraction technique searches the text elements proximate to the table bounding box 409. If a text element contains the "table" keyword, i.e. text element 411, it is extracted as the table caption. If the surrounding text elements do not contain the table keyword, and if the distances of the text elements to the table bounding box are larger than a threshold, the table is considered as having no caption. In other embodiments of the invention, the text element that is closest to the table bounding box 409 is treated as the table caption. All of the text elements within the table bounding box 409, plus the table caption are concatenated to generate "extracted table content". The extracted table content will then be indexed with related extracted text content, figure content and image content as discussed below.

As is well known, text, a table and a figure can be present on the same page of a document. FIG. 5 illustrates an extracted table and figure with their associated captions in a page of a scanned document. Once the boundaries of elements of the table and figure are determined, e.g., using the bounding box technique, the elements are passed to a figure feature extractor or a table feature extractor as appropriate. Figure content extraction is performed similarly as described above for table content extraction in that the feature extractor to extract figure content and figure captions. In a preferred embodiment, figure feature extraction differs as every figure is further classified as being an x-y plot, a diagram, a natural image or some other type of figure or image. Some users may be interested in only a certain type of figure. Also, the image/figure feature extraction techniques and how those techniques render the features into text is specific for a given type of figure or image. That is, in some embodiments, there are a plurality of image and figure extractors, each for a particular image type or figure type.

As shown in FIG. 5, the main figure indicated by the bounding box 501 drawn around the x-y line plot is passed to the figure feature extractor. Similarly, bounding box 503 drawn around the figure caption is also passed to the figure feature extractor based on its proximity to the x-y plot. The figure feature extractor can recognize elements of the figure as indicated by bounding box 505 around the x-y plot and bounding boxes 507 and 509 respectively around the y-axis and x-axis legends. The x-y plot inside bounding box 505 can be handed to a specialized figure feature extractor which renders the x-y plot into text values. For example, embodiments of the invention include automatic x-y plot feature extractors which give information like parameter values, units and slope.

In the drawing, bounding box 521 surrounds the table caption and bounding box 523 surrounds the table itself. Once the contents of bounding box 523 are recognized as a table, it is passed to a table feature extractor. As shown in the figure, bounding boxes can be drawn around elements of the table such as bounding boxes 525 which define the header text of the table. Header text is meaningful as it gives context to table entries which occur underneath the header. Further, text in the body of the document or in the table caption will often refer to the header text, providing information for the indexing step.

As described above, the table summarization module 311 and image/figure summarization module 315 respectively summarize what a table and an image/figure mean in a textual form. These components format the output of the extractors, i.e. converted text describing the detected features, into a form to be used for identifying the semantic relationships of table features and image/figure features to other features in the document in text, table or image/figure form.

Figure 7:
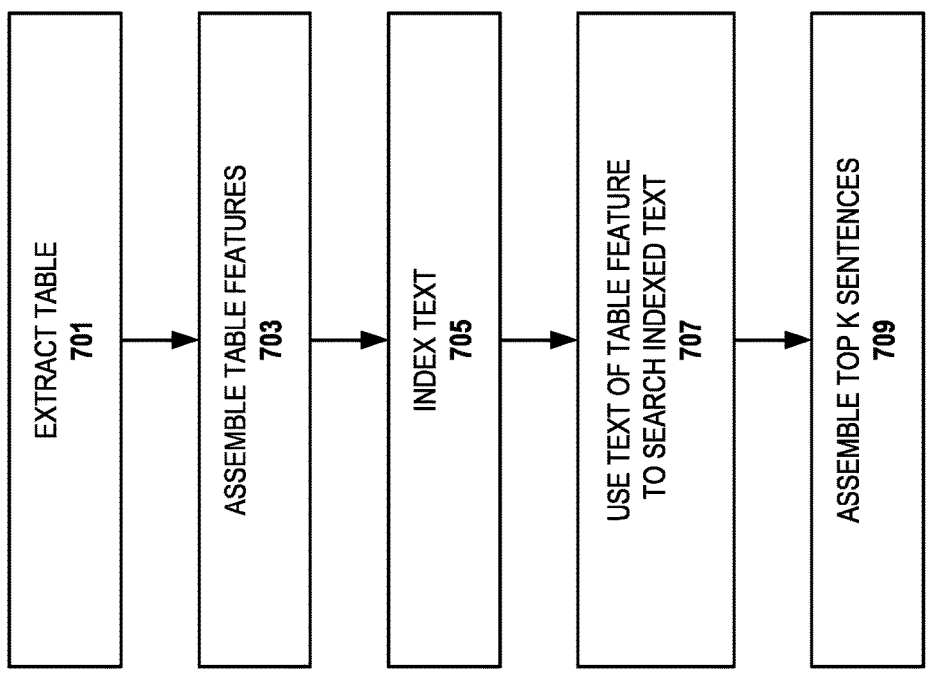
FIG. 7 illustrates a flow diagram of assembling a table summarization according to an embodiment of the invention.

One example of an output of the table summarization module for a table is illustrated by FIG. 6 which shows an extracted table 601, extracted table content 603, the table caption 605, the top five sentences that summarize the table 607 and the page where the table was found 609. Other embodiments of the invention include a textual version of metadata in the document found with the table. A sample flow diagram of the table summarization process is shown in FIG. 7. The table 601 is extracted from the table stream as it was found in the document is a first part of the output in step 701 so that the entire table can be presented in a future search. Next, the table content 603 and other text containing table features, e.g., the table caption 605, are assembled as a set of extracted table content in step 703. In embodiments of the invention, table features which have been converted into a textual form are also added to the set of extracted table content. In FIG. 6, table features such as a cell being a table header and the cell table position are shown rendered into text as part of the table content 603. The table features are often useful in future indexing or searches, as they indicate which table cells are semantically related to each other.

Optionally, a set of the five most related sentences 607 to the table is included in the output of the table summarization module. The most related sentences are found from the text of the document. Other embodiments of the invention can have a lesser or a greater number of sentences. In step 705, the text of the document is indexed. This index step is intermediate, used to prepare information/data to be indexed in the holistic indexing step. The intermediate index will be deleted after information of the current document collected. In one preferred embodiment, the set of most related sentences is determined by segmenting the text content of the document into paragraphs and then further segmenting the paragraphs into sentences. A very small temporary inverted index is built for the sentences, which is called a sentence index.

Next in step 707, the text of the table features, the extracted table content, is used to search the sentence index. In one embodiment of the invention, the text description from the identified table features is parsed to remove common words and remove numeric characters. The remaining text is used to query the inverted sentence index. The top K ranked sentences are assembled as part of the table summarization, step 709. In one embodiment, in the ranking step, the sentences are converted to vector representations using a "tf-idf" type of technique, where tf is "term frequency" and idf is inverted document frequency. A term with high frequency in a sentence will be ranked higher and a term which appears in fewer sentences will be ranked higher. Sentence similarity can then be computed as vector similarities to yield a real number as the result. In the ranking step, added weight can be given to text occurring in the table headings or table captions as the sentences which refer to these table features. The process for assembling the table, image or figure summarization and identifying the top K ranked sentences is then repeated for each table, image or figure in the document. After summaries of all the tables, images and figures of the document are built, the sentence index can be deleted. The process is repeated for other documents in the corpus.

Figure 8:
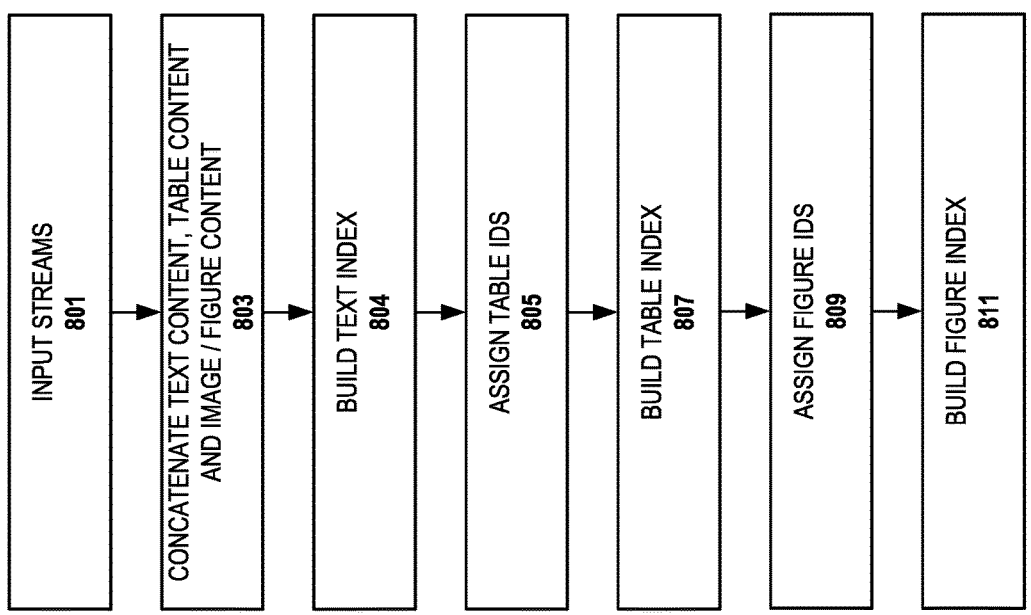
FIG. 8 illustrates a flow diagram of creating the holistic index according to an embodiment of the invention.

Next, the holistic index for the document corpus is built. This process is depicted in FIG. 8. So far, each input document has been parsed into three types of data: text content, table information and image/figure information. For each table, the table information includes the extracted table content in text format, the table summarization, the original table in the image format and the table location (page number where the table appears in the original document). In one preferred embodiment, the table summarization includes the table caption and extracted table content in text format, the table metadata (if available) and the top sentences retrieved by intermediate sentence index as well as the table location. For each image/figure, the image/figure information includes the extracted image/figure content in text format, the image/figure summarization in text format, the original image/figure in the image format, the image/figure type information, and the image/figure location (page number where the figure appears in the original document). In one preferred embodiment, the image/figure summarization in text format includes the closest sentences (if available), any text extracted from image/figure as well as information summarized from automatic image feature extractors as well as the image/figure metadata (if any). In other words, in some embodiments, the table summarization contains all of the table information, in others the table summarization contains a subset of the table information. The same is true for the image/figure summarization. Using this information as input, step 801, the holistic index is built.

An index builder, e.g., Apache Solr, Compass or ElasticSearch, is used. Other appropriate index builders can be used in other embodiments of the invention. The purpose of creating and storing an index is to optimize speed and performance in finding relevant tables, images, figures and documents for a search query. Without an index, the search engine would need to scan every document in the corpus, which would require considerable time and computing power. Briefly, the index builder finds occurrences of terms within the corpus, matches respective terms with each other according to semantic meaning and then ranks the documents according to term frequency, inverse document frequency, document scores and weights of different fields or terms. Documents can be given greater weight according to recent date, popularity and other user preferences. In embodiments of the invention, each document is structured to contain three fields, the content field, the table field and the image/figure field. Other embodiments of the invention break the image/figure field into separate fields, one for each type of defined image and figure.

For the content field, step 803, the system concatenates the text content of the document, the table content and the table summarization for each table, and the image/figure content and the image/figure summarization for each image/figure to produce concatenated text content. The concatenated text content augments the original textual part of the document by the content of tables and figures. The concatenated text content is then indexed using the traditional inverted index technique in preferred embodiments of the invention. Other indexing techniques are used in other embodiments of the invention.

For the table field, step 805, the system assigns every extracted table from a document a unique table ID. In embodiments of the invention, the table ID plus the associated document ID uniquely identifies the table. The system then stores the table image into the file system. Using the combination of the table ID and the document ID as the key is used to retrieve the table images. Since all the information about a table is now in the text format, the system treats a table as a document and builds the table index accordingly, step 807. Each table document contains three types of information: table content, table summarization and table location. As mentioned above, in embodiments of the invention, the table summarization can include the extracted table content and table location.

Similarly, in step 807, the system assigns every extracted image/figure from a document a unique image/figure ID and stores the image/figure. An index for image/figures is built, step 811, in a similar manner to the table index. In preferred embodiments of the invention, an image/figure document has a field containing the image/figure type information. In the holistic index, the content index, table index and image/ figure index are not independent, but strongly related to each other. The three correlated indexes enable one to query a document comprehensively from different perspectives.

The three indexes are related by the text summarizations which form part of all of the indexes. Text summarization reveals the semantic relationships of the table, image and text elements of the documents. If a table and an image share many commonalities in their text summarizations, it means the table and the image are very related, and thus are likely to be returned together in response to a user's search query. The location information is also used to find close relationships between given table, image and text elements. For instance, a table and an image that appear on the same page of a document will likely be more related than a table and an image appear in two different documents.

Figure 9:
FIG. 9 illustrates a graphical user interface used for an end user query according to an embodiment of the invention.

A sample user interface for formulating an end user query is depicted in FIG. 9. As shown, a text field 901 is used to enter the key words for the end user query. A set of radio button controls are used to specify what type of search results are desired. For example, if text and documents are desired, the text radio button 903 is selected; if tables are desired, the table radio button 905 is selected. If image/figures are desired, the image/figure radio button is selected. In alternative embodiments of the invention, search control terms like "table:" or "image:" can be added to the search term in the text field to specify the type of information to be returned with the search. In yet other embodiments of the invention, a natural language process is used to recognize a search statement like "Show me all the tables, figures and text having to do with Blue jay distribution in the eastern United States".

HDS supports several query scenarios. With HDS, one can query the text field of documents as in traditional document search engines. One difference is that the document content in HDS has been augmented by the table content and image/figure content. If a study result has only been reported in tables and figures, the traditional text-based document search engine will fail to retrieve the most relevant documents. However, since the tables and figures are extracted, summarized and indexed, HDS is able to retrieve the most relevant documents.

Given a query, if the user chooses to retrieve relevant documents, tables and figures, in one embodiment of the invention, HDS will issue the query to the underlying text search engine, table search engine and image/figure search engine. If only text and table information was desired, the queries would be issued only to the text and table search engines. In an alternative embodiment of the invention, a single unified search engine including the text, table and image/search indexes is issued the query.

In embodiments of the invention, because the indexed tables and figures are associated with documents, the table and image/figure search engines not only return a ranked list of tables and image/figures, but also a ranked list of the documents where the tables and images/figures are located. In some embodiments of the invention, the documents and tables and image/figures are ranked independently by the search engines. In other embodiments of the invention, the ranked lists of documents and the scores from all the search engines are combined to yield a new ranking of documents. That is, in these embodiments, HDS implements a ranking function that combines the scores of the three underlying search engines.

Figure 10:
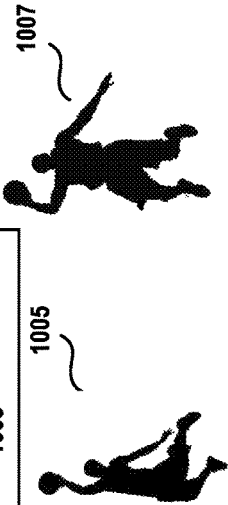
FIG. 10 illustrates a graphical user interface used to display search results returned by the holistic search system according to a preferred embodiment.

FIG. 10 depicts a sample user interface which is used in one embodiment of the invention. Those skilled in the art will understand that the drawing is merely illustrative and many other user interfaces could be used to display the search results. The search query field 1001 shows the initial query "curry basketball image: table: text:" indicating the search terms: "curry" and "basketball" and that the user wants to receive images, tables and documents in the search results. The search results are shown immediately below the query field 1001. First, the returned images legend 1003 is displayed, followed by image one 1005 and image two 1007. Given the search terms, the images might be photos of the basketball player "Stephen Curry". Next, the returned tables legend 1009 is displayed followed by table one 1011 and table two 1013, which could be respectively individual and team statistics by category. Next, the returned documents legend 1015 is displayed followed by document one 1017 and document two 1019. These documents would most likely be about the basketball player Stephen Curry and his basketball team. For purpose of illustration, only two images, two tables and two documents are shown. However, one skilled in the art would appreciate that many more search results could be returned by the holistic search engine. Preferably, the results are ranked by and displayed in order by relevance to the search terms. In alternative embodiments, the search results can be grouped so that the image, table and document results most relevant to both "curry" and "basketball" are shown first, then the image, table and document results most relevant to "curry" are shown next, followed by the image, table and documents results most relevant to "basketball". Within the search results, the results for a respective image, table or document may be shown in an abbreviated form, e.g., an icon or a summary, wherein the full version of the image, table or document can be displayed by user selection of the abbreviated form.

As illustrated in the drawing, embodiments of the HDS system not only retrieve a ranked list of documents, but also go beyond the document level to return a ranked list of tables and ranked list of images and figures. The tables and images are not summaries of the document, but independent retrieval results. Therefore, the HDS system can retrieve information at a more refined scale.

The present invention has many advantages over the prior art. By indexing text descriptions of the visual elements of the documents in the holistic index, embodiments of the invention allow a user to selectively search both text and visual elements of the documents. The search results are ranked according to the relationships between all of the components of the document, both text and visual elements.

While a preferred operating environment and use case has been described, the techniques herein may be used in any other operating environment in which it is desired to deploy services.

As has been described, the functionality described above may be implemented as a standalone approach, e.g., one or more software-based functions executed by one or more hardware processors, or it may be available as a managed service (including as a web service via a SOAP/XML or RESTful interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the functions are implemented in software, which includes but is not limited to firmware, resident software, microcode, and the like. Furthermore, the search interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows:

1. An improved method for indexing a searchable set of documents comprising:
    parsing a set of documents, respective members of the set of documents including a set of text elements and a set of visual elements, to produce a text content stream based on the set of text elements and a visual content stream based on the set of visual elements;
    for respective documents in the set of documents, building a set of respective visual element summarizations from the visual content stream, each visual summarization including a textual description of a respective visual element in the respective document;
    wherein the visual content stream further includes a set of tables;
    for a respective table in the set of tables, extracting a set of table features:
    converting the extracted set of table features into a table summarization including a textual description of the respective table, wherein the table summarization is a visual summarization:
    creating a holistic index by indexing the text content from the text content stream and the textual descriptions of the visual elements in a single search index, wherein the indexing is performed for each document according to a set of semantic relationships between the text content from the text content stream from a particular document and the textual descriptions of the visual elements from the particular document, wherein a semantic relationship is a relationship between meaning of respective sets of words; and
    displaying a user interface allowing a user to selectively retrieve text content and visual content from the set of documents.

2. The method as recited in claim 1, further comprising including a respective table in the table summarization.

3. The method as recited in claim 1, wherein creating the holistic index by indexing text content and visual content in a single search index is performed according to proximity relationships in addition to the semantic relationships between the respective visual content and the text content in the document.

4. The method as recited in claim 2, wherein the table summarization for a respective table further comprises a set of sentences from the document which are semantically closest to the textual content in the table summarization.

5. The method as recited in claim 1, further comprising:
    concatenating the text content of the document and the table summarization for each table to produce a concatenated text content; and
    wherein the concatenated text content is used for creating the holistic index.

6. The method as recited in claim 5, wherein the visual content includes a set of images, and the method further comprises:
    extracting a set of image features from a respective image; and converting the extracted set of image features into an image summarization including a description of the respective image in a textual form and an image type.

7. The method as recited in claim 6, wherein for the creating a holistic index, an entry for each document is structured as containing three fields, a content field, a table field and an image field, wherein the content field includes a concatenation of the text content of the document, the table content and the table summarization for each table, and the image content and the image summarization for each image.

8. Apparatus, comprising:
a processor;
computer memory holding computer program instructions executed by the processor for indexing a searchable set of documents, the computer program instructions comprising:
program code, operative to parse a set of documents, respective members of the set of documents including a set of text elements and a set of visual elements, to produce a text content stream based on the set of text elements and a visual content stream based on the set of visual elements;
program code, operative to build a set of respective visual element summarizations from the visual content stream, each visual summarization including a textual description of a respective visual element in a respective document, wherein the visual content stream further includes a set of tables and for a respective table in the set of tables, building a table summarization from an extracted set of table features, the table summarization including a textual description of the respective table, wherein the table summarization is a visual summarization;
program code, operative to create a holistic index by indexing the text content from the text content stream and the textual descriptions of the visual elements in a single search index, wherein the indexing is performed for each document according to a set of semantic relationships between the text content from the text content stream from the document and the textual descriptions of the visual elements from the document; and
program code, operative to display a user interface allowing a user to selectively retrieve text content and visual content from the set of documents.

9. The apparatus as recited in claim 8, wherein the program code, operative to create the holistic index by indexing text content and visual content in a single search index uses proximity relationships in addition to the semantic relationships between the respective visual content and the text content in the document.

10. The apparatus as recited in claim 9, further comprising:
program code, operative to concatenate the text content of the document and the table summarization for each table to produce a concatenated text content; and
program code, operative to use the concatenated text content to create the holistic index.

11. The apparatus as recited in claim 9, further comprising program code operative to extract a set of visual features from the set of visual elements comprising a plurality of extraction modules, each extraction module for extracting features for a respective type of visual element.

12. The apparatus as recited in claim 8, further comprising:

program code, operative to include a set of sentences from the document which are semantically closest to the textual content in the table summarization for a respective table.

13. A computer program product in a non-transitory computer readable medium for use in a data processing system, the computer program product holding computer program instructions executed by the data processing system for indexing a searchable set of documents, the computer program instructions comprising:
program code, operative to parse a set of documents, respective members of the set of documents including a set of text elements and a set of visual elements, to produce a text content stream based on the set of text elements and a visual content stream based on the set of visual elements;
program code, operative to build a set of respective visual element summarizations from the visual content stream, each visual summarization including a textual description of a respective visual element in a respective document, wherein the visual content stream further includes a set of tables and for a respective table in the set of tables, building a table summarization from an extracted set of table features, the table summarization including a textual description of the respective table, wherein the table summarization is a visual summarization;
program code, operative to create a holistic index by indexing the text content from the text content stream and the textual descriptions of the visual elements in a single search index, wherein the indexing is performed according to a set of semantic relationships between the text content from the text content stream from the document and the textual descriptions of the visual elements from the document; and
program code, operative to display a user interface allowing a user to selectively retrieve text content and visual content from the set of documents.

14. The computer program product as recited in claim 13, wherein the visual content includes a set of images, and the product further comprises:
program code, operative to extract a set of image features from a respective image; and
program code, operative to convert the extracted set of image features into an image summarization including a description of the respective image in a textual form.

15. The computer program product as recited in claim 14, further comprising:
program code, operative to include a set of sentences from the document which are semantically closest to the textual content in the table summarization for a respective table;
program code, operative to concatenate the text content of the document and the table summarization for each table to produce a concatenated text content; and
program code, operative to use the concatenated text content to create the holistic index.

16. The computer program product as recited in claim 13, wherein the program code, operative to create the holistic index by indexing text content and visual content in a single search index uses proximity relationships in addition to the semantic relationships between the respective visual content and the text content in the document.

17. The computer program product as recited in claim 14, further comprising program code, operative to perform an intermediate indexing step which determines a set of most related text content to be included in the table summarization.

18. The computer program product as recited in claim 13, wherein the visual summarization includes text which occurs in the visual element and visual features of the visual element which have been converted to a textual form.

* * * * *